Jan. 24, 1928. 1,656,921
J. F. MONNOT
APPARATUS FOR CLEANING THE WIND SCREENS OF MOTOR PROPELLED VEHICLES
Filed April 11, 1925
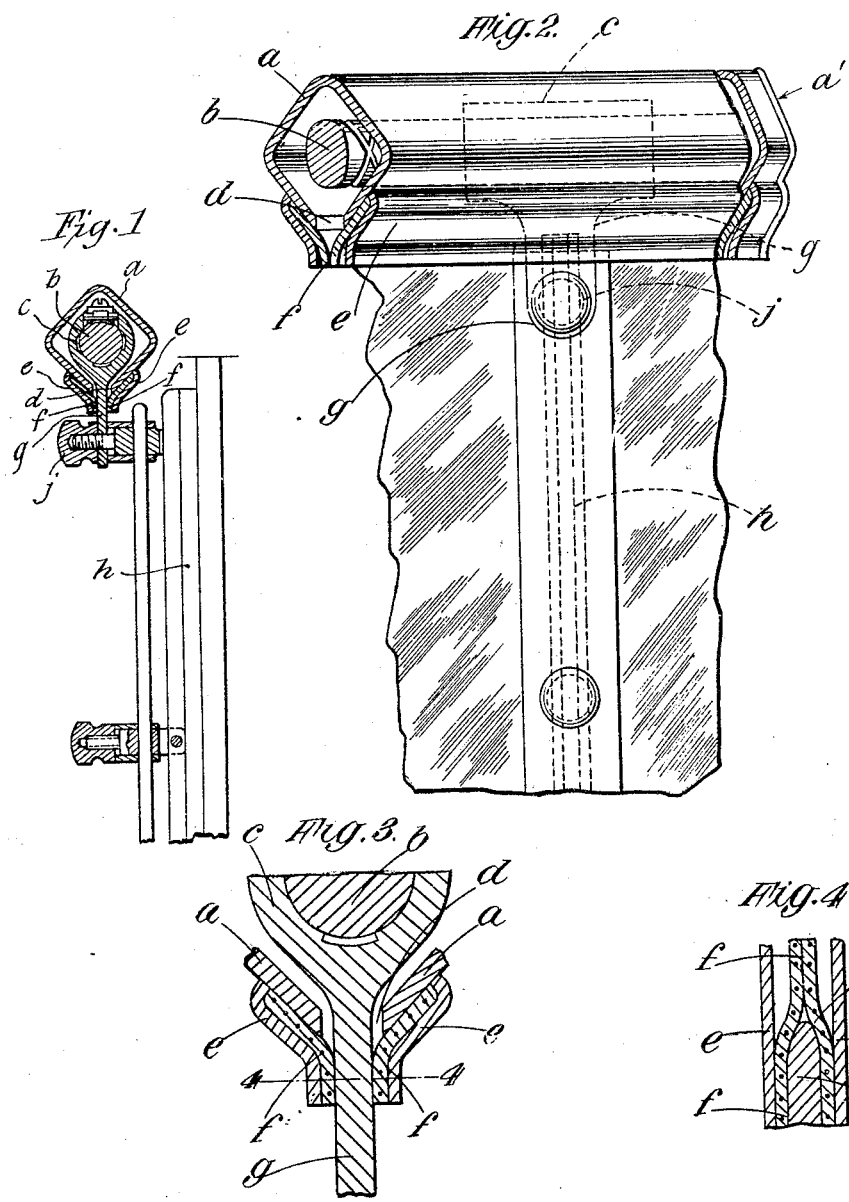
INVENTOR
John F. Monnot
BY
Pennie Davis Marvin & Edmonds
ATTORNEYS Patented Jan. 24, 1928.

1,656,921

UNITED STATES PATENT OFFICE.

JOHN FERREOL MONNOT, OF MILL HILL, ENGLAND.

APPARATUS FOR CLEANING THE WIND SCREENS OF MOTOR-PROPELLED VEHICLES.

Application filed April 11, 1925, Serial No. 22,317, and in Great Britain December 23, 1924.

This invention has reference to apparatus for cleaning the wind-screens of motor propelled vehicles, the apparatus being of the kind wherein the wiper or squeegee is moved in contact with the glass of the screen through the medium of a sleeve or nut mounted on a screw, the latter having a single or reversing screw thread and adapted to be operated by hand or power motor, and the sleeve or nut having a part to which is attached the wiper or squeegee.

It is found in practice that the known forms of construction of apparatus of this character very quickly become inoperative owing to dust collecting on the screen and in the sleeve or nut, such dust passing into the casing containing the screw and sleeve or nut through the opening which is provided in the casing for the travel of the part connecting the wiper or squeegee with the sleeve or nut.

According to this invention the apparatus is so constructed as to prevent the ingress of dust to the interior of the casing, thereby rendering the apparatus of practicable utility and enabling the same to be successfully employed in connection with the wind screens of motor propelled vehicles. To this end the casing is so provided as to permit of the movement of the part connecting the wiper to the sleeve or nut lengthwise of the screw and at the same time maintain the opening in which the said part is moved in a closed condition. Preferably the opening is fitted with strips of elastic or flexible material, the strips forming elastic or flexible lips to the opening and being so secured to the margins of the opening that the free edges thereof normally bear against each other but are adapted to be separated from each other at points corresponding with the position of the aforesaid part, such separation coinciding with the part during its reciprocatory movements lengthwise of the casing. Thus the lips of elastic or flexible material are in contact with each other from each end of the casing to the said part and are only separated for a length approximately equal to the width of the said part. In order to facilitate the movement of the said part lengthwise of the opening and ensure the edges of the lips returning into contact during such movement, the said part may be formed of comparatively thin metal plate and provided with bevelled or tapered edges. The casing may be of rectangular, circular or other suitable cross section.

In order that the said invention may be clearly understood and readily carried into effect, the same will now be fully described with reference to the accompanying drawing, in which.

Fig. 1 is a transverse section of the casing enclosing the screw on which the sleeve and parts connected therewith are mounted;

Fig. 2 is an elevation of parts of the casing squeegee and screen;

Fig. 3 is a detail view in section to an enlarged scale of part of the casing and flexible members, and Fig. 4 is a transverse section taken on the line 4—4 of Fig. 3.

The casing $a$ which encloses the screw $b$ and sleeve or nut $c$ is of rectangular shape in cross section and has a slot $d$ formed lengthwise thereof at one of the angular edges. To the margins of the slot $d$ are secured by means of plates $e$ the strips of elastic or flexible material $f$. Owing to the disposition of the sides of the casing adjacent to the said slot $d$ the strips of material $f$ extend towards each other and form lips which press against each other and close the entrance to the slot as more particularly shown in Figs. 2 and 4. Between these lips projects the part $g$ of the sleeve or nut $c$ and to such part is attached the wiper or squeegee $h$ by a screw stud and nut fitting $j$ or its equivalent. The part $g$ is comparatively thin and wide in order to respectively separate the lips as small a distance as possible and to provide a plate of sufficient strength to carry the wiper or squeegee and transmit movement thereto. The edges of the part $g$ are also bevelled or tapered as indicated in Fig. 4 to ensure the lips contacting with each other up to the said edges. To prevent the ingress of dust at the ends each end of the casing $a$ is provided with an end plate, such as is shown on one end of the casing in Fig. 2, the end plate $a^1$ overlapping the ends of the strips $f$. The plates $e$ which serve for holding the strips in position are preferably curved as shown and formed with recessed or undercut inner surface for receiving the margins of the strips secured between the casing $a$ and the plates $e$. The strips may be made of felt, cloth, or other appropriate material and may be reinforced as shown in Figs. 3 and 4. With an arrangement as hereinbefore described the strips of elastic or flexible material which normally close the slot $d$ are moved apart by the part $g$ as the sleeve or nut travels on the screw $b$, and as fast as the part $g$ travels along the slot $d$ the material closes the opening left by the moving part $g$.

What I claim and desire to secure by Letters Patent of the United States is:—

An apparatus for cleaning wind-screens of motor propelled vehicles, comprising in combination, a casing provided with a longitudinal slot; a squeegee; mechanism connected with the squeegee and enclosed in the casing for reciprocating the squeegee lengthwise of the casing, and flexible members arranged on the opposite sides of the slot in the casing and having free edges adapted to bear against each other and the connection between the squeegee and the mechanism, the said flexible members serving to render the casing entirely dust-tight.

JOHN FERREOL MONNOT.